(12) United States Patent
Lee

(10) Patent No.: US 11,607,935 B2
(45) Date of Patent: Mar. 21, 2023

(54) SLIDING/SWING COMPLEX DOOR FOR VEHICLE

(71) Applicants: Hyundai Motor Company, Seoul (KR); Kia Motors Corporation, Seoul (KR)

(72) Inventor: Jae Seung Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 298 days.

(21) Appl. No.: 17/080,010

(22) Filed: Oct. 26, 2020

(65) Prior Publication Data

US 2021/0138880 A1 May 13, 2021

(30) Foreign Application Priority Data

Nov. 7, 2019 (KR) .................. 10-2019-0141522

(51) Int. Cl.
| | |
|---|---|
| *B60J 5/04* | (2006.01) |
| *B60J 5/06* | (2006.01) |
| *B60J 5/12* | (2006.01) |
| *E05B 83/40* | (2014.01) |
| *E05B 79/20* | (2014.01) |
| *B60J 5/10* | (2006.01) |

(52) U.S. Cl.
CPC .............. *B60J 5/047* (2013.01); *B60J 5/06* (2013.01); *B60J 5/105* (2013.01); *B60J 5/12* (2013.01); *E05B 79/20* (2013.01); *E05B 83/40* (2013.01); *E05Y 2900/531* (2013.01)

(58) Field of Classification Search
CPC ..... B60J 5/047; B60J 5/06; B60J 5/105; B60J 5/12; B60J 5/0486; E05B 79/20; E05B 83/40; E05D 15/48; E05D 15/58; E05D 2015/485
See application file for complete search history.

(56) References Cited

U.S. PATENT DOCUMENTS

| | | | | |
|---|---|---|---|---|
| 6,007,139 | A * | 12/1999 | Shave ........................ | B60J 5/12 296/146.8 |
| 7,097,229 | B1 * | 8/2006 | Chernoff .................... | B60J 5/06 296/146.12 |
| 8,567,126 | B2 * | 10/2013 | Hozumi ..................... | B60J 5/06 49/143 |
| 8,925,248 | B2 * | 1/2015 | Maruyama ............... | B60J 5/047 49/164 |
| 9,073,413 | B2 * | 7/2015 | Maruyama ............... | B60J 5/047 |
| 9,718,331 | B2 * | 8/2017 | Maruyama ............. | E05B 83/40 |
| 9,731,583 | B2 * | 8/2017 | Maruyama ............... | B60J 5/047 |
| 10,024,084 | B2 | 7/2018 | Choi | |
| 10,518,616 | B2 * | 12/2019 | Houmani ................ | E05D 15/48 |

(Continued)

FOREIGN PATENT DOCUMENTS

KR         101786663 B1    10/2017

*Primary Examiner* — Justin B Rephann
(74) *Attorney, Agent, or Firm* — Slater Matsil, LLP

(57) ABSTRACT

A sliding/swing complex door for a vehicle includes a sliding door configured to be opened upon a first operation of an outside handle positioned on an outside of the sliding door, a swing door configured to be integrated and opened with the sliding door upon a second operation of the outside handle, and a fixing unit configured to be opened in such a way to be integrated and rotated with the swing door in a state in which the sliding door is fully opened.

20 Claims, 10 Drawing Sheets

(56) References Cited

U.S. PATENT DOCUMENTS

| | | | | |
|---|---|---|---|---|
| 11,008,785 B2* | 5/2021 | Perez | ............... | E05B 79/22 |
| 2003/0218358 A1* | 11/2003 | Hahn | ............... | B60J 5/047 |
| | | | | 296/155 |
| 2006/0197357 A1* | 9/2006 | Catania | ............... | E05D 15/58 |
| | | | | 296/155 |
| 2013/0227887 A1* | 9/2013 | Ojima | ............... | B60J 5/047 |
| | | | | 49/143 |
| 2016/0272053 A1* | 9/2016 | Maruyama | ............... | E05D 13/04 |
| 2016/0273262 A1* | 9/2016 | Maruyama | ............... | E05B 79/10 |
| 2017/0268263 A1* | 9/2017 | Dow | ............... | E05B 79/08 |
| 2018/0202200 A1* | 7/2018 | Perez | ............... | E05B 77/22 |
| 2021/0047868 A1* | 2/2021 | Perez | ............... | E05B 79/20 |
| 2022/0090421 A1* | 3/2022 | Choi | ............... | B60J 5/047 |

\* cited by examiner

SLIDING/SWING COMPLEX DOOR FOR VEHICLE

CROSS-REFERENCE TO RELATED APPLICATIONS

This application claims the benefit of Korean Application No. 10-2019-0141522, filed on Nov. 7, 2019, which application is hereby incorporated herein by reference.

TECHNICAL FIELD

The present disclosure relates to a sliding/swing complex door for a vehicle.

BACKGROUND

A door for a vehicle includes several types. Among the types, a swing type chiefly applied to a passenger car, a sliding type chiefly applied to a mid-size van, and a hatchback type chiefly applied to the tail gates of a van and an RV vehicle may be taken as examples. In general, a vehicle provided with a sliding door has a structure for improving getting in a car and getting-in and -out convenience in a narrow space in such a manner that the door slides as close as possible to a vehicle body.

In the case of a vehicle, such as a van in which many people may get in, an opening and closing door for a vehicle passenger compartment is configured to open and close the vehicle passenger compartment while performing a sliding motion back and forth in the length direction of the vehicle. The opening and closing door using the sliding method for a vehicle, such as a van, moves backward in the length direction of the vehicle to open the vehicle passenger compartment, and moves forward in the length direction of the vehicle to close the vehicle passenger compartment. Accordingly, the opening and closing door using the sliding method has advantages in that a required opening and closing space for the opening and closing of the door is small and a door opening part formed in a vehicle body can be fully opened even in a narrow opening and closing space, compared to an opening and closing door for a hinge type vehicle passenger compartment for a vehicle, such as a passenger car.

However, the opening and closing door using the sliding method has a problem in that an opening width is limited compared to the door using the swing method although the opening and closing door is fully slid and opened due to limitations in the opening and closing door configured to be opened and closed using the sliding method.

The door using the swing method has an advantage in that the opening width of the vehicle can be maximized if the door is fully opened. However, if a structure is adjacent to the door using the swing method, the door may have space constraints when a person gets in the vehicle or loads goods in the vehicle or unloads goods from the vehicle because the door cannot be fully opened if the door touches the structure.

For the opening and closing of a door for a vehicle, an outside handle is exposed outside a door panel, and a door latch assembly locked or released by means, such as a remote controller or a key, is mounted inside the door panel. Accordingly, when a user wants to open the door normally from the outside of the vehicle, if the user manipulates an opening button using the remote controller, the solenoid of the door latch assembly that receives a signal from the remote controller operates in the opening direction of the door, and thus the locking of the door latch is released. Thereafter, when the user pulls the outside handle of the door in the opening direction of the door, the door is opened.

Korean Patent No. 10-1786663 is related to the subject matter of this application.

SUMMARY

The present disclosure has been made to solve problems in the related art.

The present disclosure relates to a sliding/swing complex door for a vehicle. Particular embodiments relate to a complex door having advantages of a sliding method and a swing method mixed by combining the sliding and swing methods with a door system for a vehicle.

Furthermore, embodiments of the present disclosure provide a sliding/swing complex door for a vehicle which can be opened and closed using the sliding method and the swing method based on a change in the operation method of a single outside handle.

Features of the present disclosure are not limited to the aforementioned features, and other features of the present disclosure not described above may be understood from the following description and evidently understood based on the described embodiments of the present disclosure. Furthermore, features of the present disclosure may be realized by means written in the claims and a combination thereof.

A sliding/swing complex door for a vehicle includes the following construction.

In an embodiment of the present disclosure, there is provided a sliding/swing complex door for a vehicle, including an outside handle positioned on the outside of the sliding door, a sliding door opened upon first operation of the outside handle, a swing door integrated and opened with the sliding door upon second operation of the outside handle, and a fixing unit fixed to be opened in such a way to be integrated and rotated with the swing door in the state in which the sliding door is fully opened.

Furthermore, there is provided the sliding/swing complex door for a vehicle, wherein the outside handle includes a body part and a handle cover part, and the body part is configured to include a sliding body movable in a sliding direction in a way integrated with the handle cover part upon first operation, and a swing body capable of being integrated and pulled along with the handle cover part upon second operation.

Furthermore, there is provided the sliding/swing complex door for a vehicle, further including a sliding striker mounted on the inside of a vehicle body, a sliding latch part positioned on the inside of the sliding door and configured to be coupled to or released from the sliding striker, and a sliding handle lever rod coupled to be released from the sliding striker by applying tension to the sliding latch part upon first operation.

Furthermore, there is provided the sliding/swing complex door for a vehicle, further including a swing striker mounted on the inside of a vehicle body, a swing latch part positioned on the inside of the swing door and configured to be coupled to or released from the swing striker, and a swing latch cable coupled to be released from the swing striker by applying tension to the swing latch part upon second operation.

Furthermore, there is provided the sliding/swing complex door for a vehicle, wherein a first fixing part is further included in the back of the sliding door, and the first fixing part is coupled to a swing handle lever rod positioned at one end of the outside handle and configured to be rotated.

Furthermore, there is provided the sliding/swing complex door for a vehicle, wherein the swing door further includes a second fixing part formed in accordance with a location of the first fixing part where the sliding door is fully opened and coupled to the first fixing part, and the swing door is configured so that the second fixing part is integrated and rotated with the first fixing part by the rotation of the first fixing part upon second operation and a swing latch cable coupled to the top of the second fixing part is configured to decouple a swing latch part and a swing striker by applying tension to the swing latch part.

Furthermore, there is provided the sliding/swing complex door for a vehicle, further including a first rail fixed to a vehicle body, wherein a first roller and a second roller disposed at the top of the sliding door move along the first rail in accordance with an opening operation of the sliding door.

Furthermore, there is provided the sliding/swing complex door for a vehicle, further including a second rail fixed to a back of the swing door and positioned at a location lower than the first rail, wherein a third roller and a fourth roller disposed in the middle of the sliding door move along the second rail in accordance with an opening operation of the sliding door.

Furthermore, there is provided the sliding/swing complex door for a vehicle, further including an opening part positioned at the end of the first rail and formed to correspond to a location of the first roller and the second roller when the sliding door is fully opened.

Furthermore, there is provided the sliding/swing complex door for a vehicle, wherein the fixing unit includes a fixing pin positioned at one end of the sliding door and a catch positioned at one end of the swing door to correspond to a location of the fixing pin, and when the sliding door is fully opened, the catch is rotated to fix the fixing pin.

Furthermore, there is provided the sliding/swing complex door for a vehicle, further including a catch lock adjacent to the catch and configured to be engaged with the catch, a catch lock cable coupled to the end of the catch lock and applying tension to release a lock state of the catch lock, and an overslam bumper positioned at the back of the swing door and configured to be coupled to the catch lock by the catch lock cable.

Furthermore, there is provided the sliding/swing complex door for a vehicle, wherein the catch is configured to be rotated so that a hitch part provided at one end of the catch is engaged with the catch lock.

Furthermore, there is provided the sliding/swing complex door for a vehicle. When the swing door is closed, the overslam bumper is compressed by a vehicle body and applies the tension to the catch lock cable so that the lock state of the catch lock is released.

Furthermore, there is provided the sliding/swing complex door for a vehicle, wherein the overslam bumper includes a cylinder housing positioned on the outside of the overslam bumper, an overslam rod positioned within the cylinder housing and configured to be movable up and down, an overslam spring positioned under the overslam rod to provide an elastic force, a gear unit formed on one side of the overslam rod and configured to rotate a rotator when the overslam rod moves up and down, and the rotator positioned on the side of the cylinder housing corresponding to the gear unit and configured to be integrated and rotated with the gear unit, and the overslam bumper is configured so that when the swing door is closed, the gear unit moves downward and rotates the rotator to apply tension to the catch lock cable.

DETAILED DESCRIPTION OF ILLUSTRATIVE EMBODIMENTS

Hereinafter, embodiments of the present disclosure are described in detail with reference to the accompanying drawings. Embodiments of the present disclosure may be modified in various forms, and the scope of the present disclosure should not be construed as being limited to the following embodiments. The present embodiments are provided to a person having ordinary knowledge in the art to more fully describe the present disclosure.

Furthermore, a term " . . . unit (or part)" described in this specification means a unit in which at least one function or operation is processed, and may be implemented by hardware or a combination of pieces of hardware.

Furthermore, in this specification, a "height direction" means the height direction of a vehicle. A "width direction" means the outside direction of the vehicle. A "length direction" means a direction in which a sliding door 200 is opened or closed.

Figure 1A:
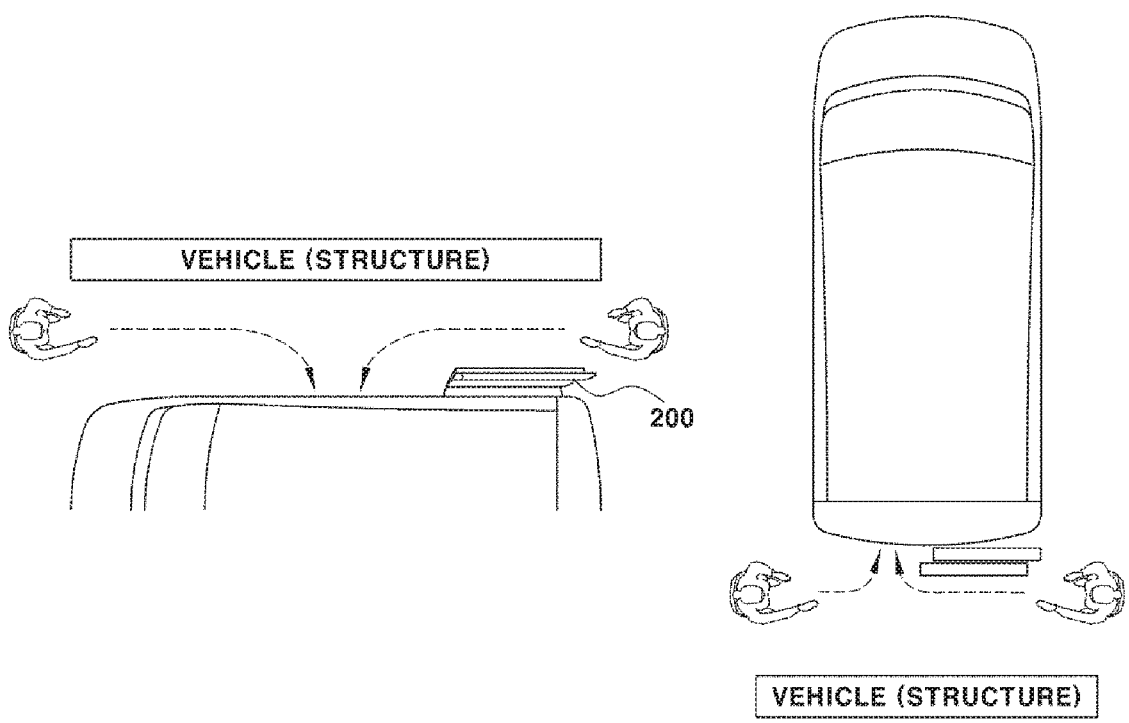
FIG. 1A illustrates a sliding opening state of a sliding/swing complex door for a vehicle.
Figure 1B:
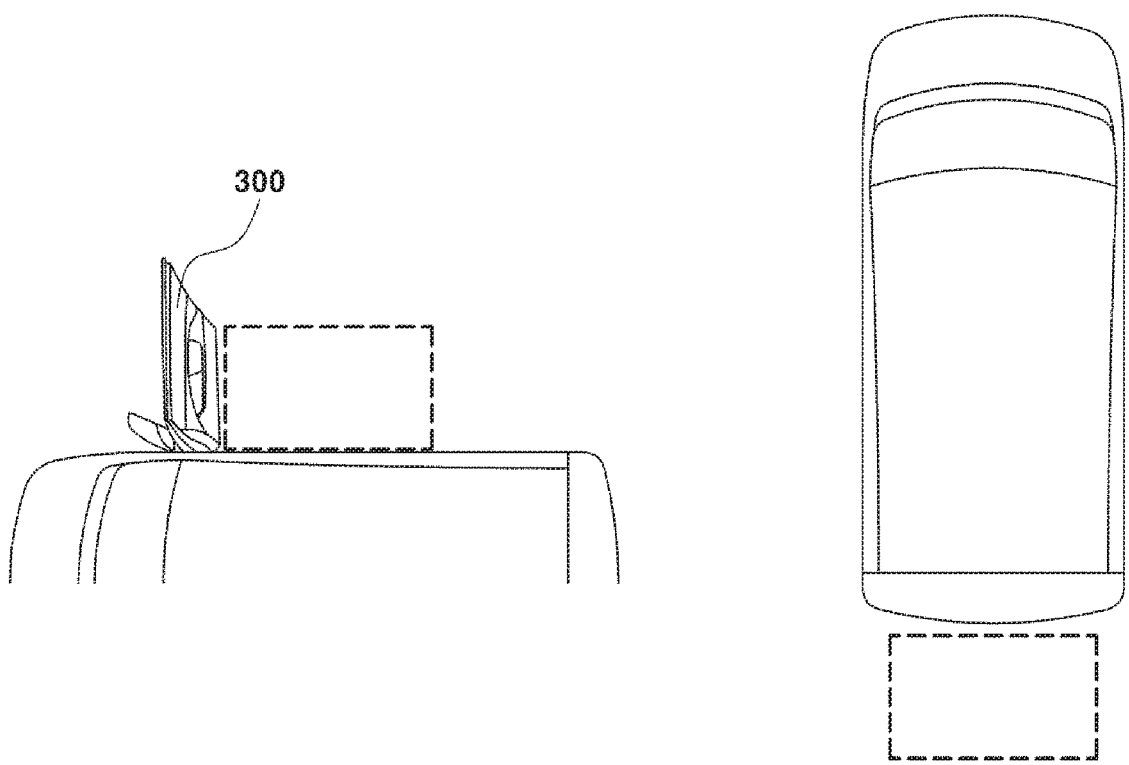
FIG. 1B illustrates a swing opening state of the sliding/swing complex door for a vehicle.

The present disclosure relates to a sliding/swing complex door for a vehicle. FIG. 1A illustrates the sliding opening state of a sliding/swing complex door for a vehicle. FIG. 1B illustrates the swing opening state of the sliding/swing complex door for a vehicle.

The sliding door 200 is configured to be adjacent to a vehicle body 400 and opened or closed in the length direction of the vehicle body 400, so the sliding door can be fully opened or closed even in a narrow space. Accordingly, getting-in and -out convenience can be improved, and a getting-in and -out space can be easily secured. The sliding door 200 according to an embodiment of the present disclosure may be configured to be opened or closed in the length direction of the vehicle body 400 along a first rail 410 fixed to the vehicle body 400 and a second rail 350 fixed to the back of a swing door 300.

One end of the swing door 300 may be hinged to the vehicle body 400 on the other side of the sliding door 200. The other end of the swing door 300 may be outward pulled or inward pushed in the width direction of the vehicle body 400 on the basis of the hinge coupling. Since the sliding door 200 is fully opened, overlapped and integrated with the swing door 300 and rotated therewith, all the areas of the opening part of the vehicle can be opened. Accordingly, there is an effect in that space can be easily secured if bulky goods are loaded. The swing door 300 according to an embodiment of the present disclosure may be overlapped with the back of the sliding door 200 when the sliding door 200 is fully opened. The swing door 300 may be configured to have a hinge coupling structure formed on one side thereof and integrated and rotated with the sliding door 200 that is fully opened.

Figure 2:
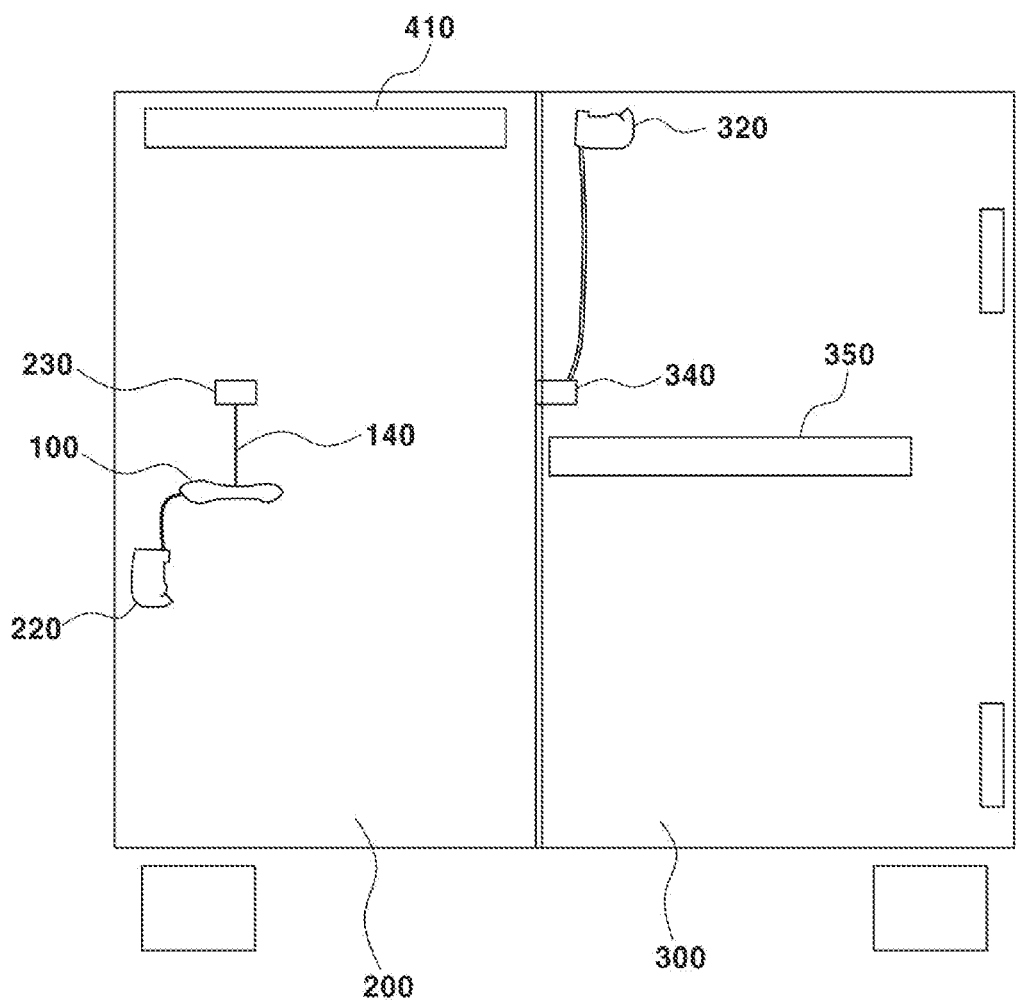
FIG. 2 illustrates a front view of the sliding/swing complex door for a vehicle as an embodiment of the present disclosure.
Figure 3A:
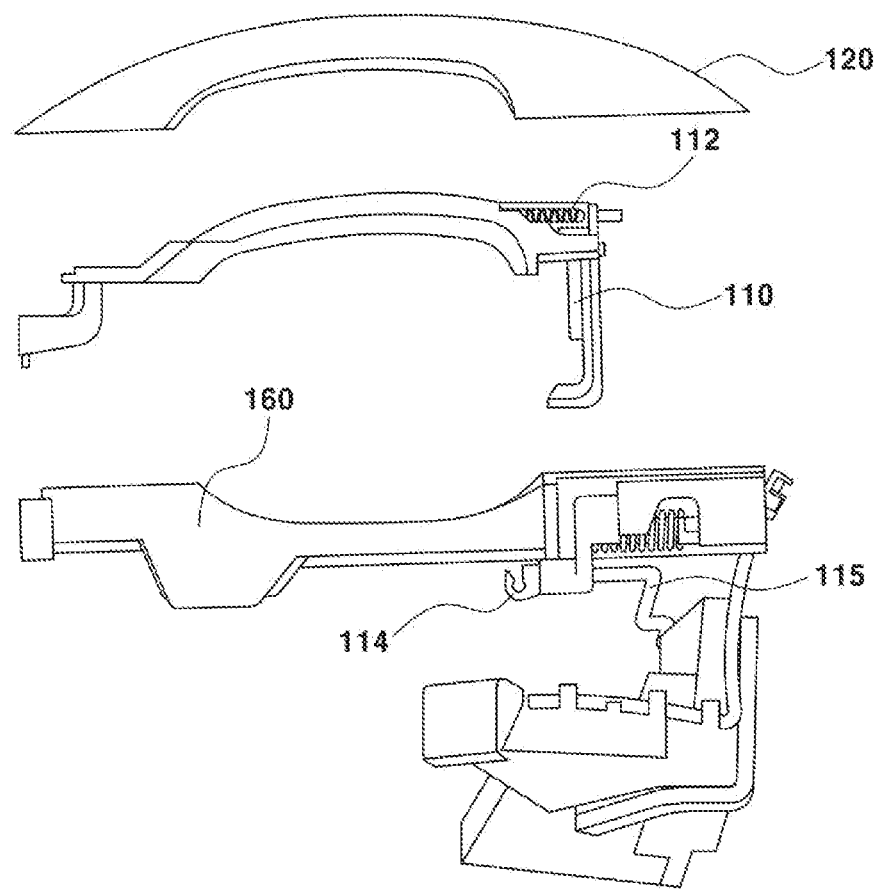
FIG. 3A illustrates an outside handle of the sliding/swing complex door for a vehicle as an embodiment of the present disclosure.
Figure 3B:
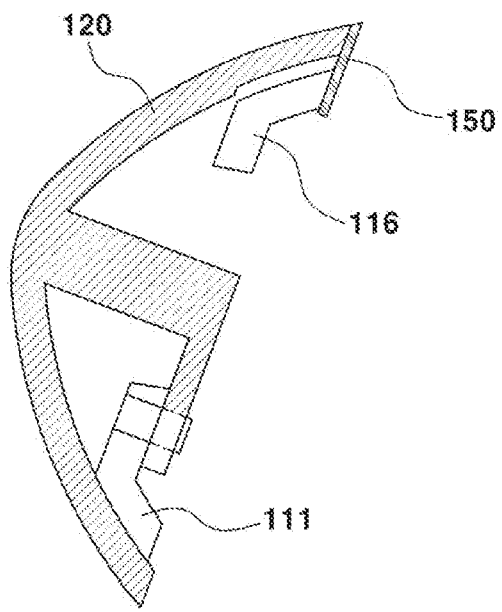
FIG. 3B illustrates a lateral cross-sectional view of the outside handle of the sliding/swing complex door for a vehicle as an embodiment of the present disclosure.

FIG. 2 illustrates a front view of the sliding/swing complex door for a vehicle as an embodiment of the present disclosure. FIG. 3A illustrates an outside handle 100 of the sliding/swing complex door for a vehicle as an embodiment of the present disclosure. FIG. 3B illustrates a lateral cross-sectional view of the outside handle of the sliding/swing complex door for a vehicle as an embodiment of the present disclosure.

Referring to FIG. 2, the sliding/swing complex door for a vehicle according to an embodiment of the present disclosure may be configured to include the outside handle 100 positioned on the outside of the sliding door 200, the sliding door 200 opened upon first operation of the outside handle 100, the swing door 300 opened in a way integrated with the sliding door 200 upon second operation of the outside handle 100, and a fixing unit for fixing the sliding door 200 to be rotated and opened in a way integrated with the swing door 300 in the state in which the sliding door 200 is fully opened.

The outside handle 100 may be positioned on the outside of the sliding door 200, and more preferably, may be positioned at a central part in the height direction of the sliding door 200. Furthermore, if door latch units 220 and 320 are coupled and a user manipulates the outside handle 100, the outside handle 100 may be configured to easily release the sliding door 200 and the swing door 300 from the vehicle body 400 as the door latch units 220 and 320 are released. Accordingly, the number of parts, weight and a prime cost related to the outside handle 100 can be reduced because the sliding door 200 and/or the swing door 300 can be opened or closed by only the one outside handle 100 mounted on the vehicle body 400.

The outside handle 100 may be configured to perform a two-stage operation. More preferably, upon first operation, the sliding door 200 may be opened. Upon second operation in the state in which the sliding door 200 is fully opened, the sliding door 200 and the swing door 300 may be rotated and opened in an integrated way.

Referring to FIGS. 3A and 3B, the outside handle may include a body part 110 and a handle cover part 120. The body part 110 may be configured to include a sliding body 11 which may be integrated with the handle cover part 120 and moved in the length direction upon first operation and a swing body 116 which may be integrated and pulled along with the handle cover part 120 upon second operation.

The handle cover part 120 is formed to surround the body part 110, and may be configured to be protruded to the outside of the vehicle body 400. A handle base 160 may be configured to be coupled to the sliding latch part 220.

The body part 110 may be configured with the sliding body 111 and the swing body 116, and may be separated and configured at the top and bottom, respectively, within the handle cover part 120. More preferably, a body part hitch jaw 150 may be formed within the handle cover part 120, and may be configured to have the sliding body in and the handle cover part 120 fixed through a screw. The swing body 116 is not fixed to the handle cover part 120 and thus can be freely moved. A movement of the swing body 116 in the height direction may be restricted by the body part hitch jaw 150.

A restoring spring 112 mounted on the body part 110 may provide an elastic force so that the sliding body 111 returns to its original location if the sliding body 11 is moved in the length direction by the first operation.

The handle cover part 120 may be integrated with the sliding body in and slid in the length direction of the vehicle by the first operation of the outside handle 100. The first operation may be an operation of pushing backward the outside handle 100 in the length direction of the vehicle. More preferably, the sliding door 200 may be fully opened by the first operation. The fully opened sliding door 200 is fixed to the swing door 300 at the back, and may be configured to be rotated and opened in a way integrated with the swing door 300.

The sliding body in moved in the length direction by the first operation may be returned to its original location by the restoring spring 112. More preferably, the sliding body 111 may be returned to a location corresponding to the swing body. Upon first operation, a sliding handle lever 114 may be rotated in a direction opposite its rotating direction by an elastic force of a lever spring 113 coupled to the sliding handle lever 114, and thus may be returned to its original location.

After the sliding door 200 is fully opened, when the second operation is performed on the outside handle 100, the sliding door 200 and the swing door 300 may be integrated, rotated and additionally opened. The second operation may be an operation of pulling the outside handle 100. The handle cover part 120 and the body part 110 may be pulled in an integrated way by the second operation.

Figure 3C:
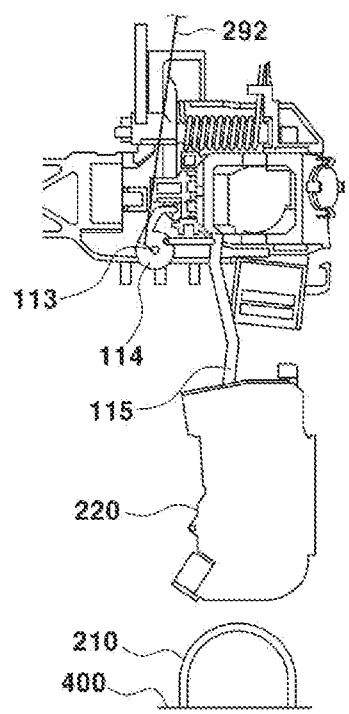
FIG. 3C illustrates a plan view of major parts of the sliding/swing complex door for a vehicle as an embodiment of the present disclosure.
Figure 3D:
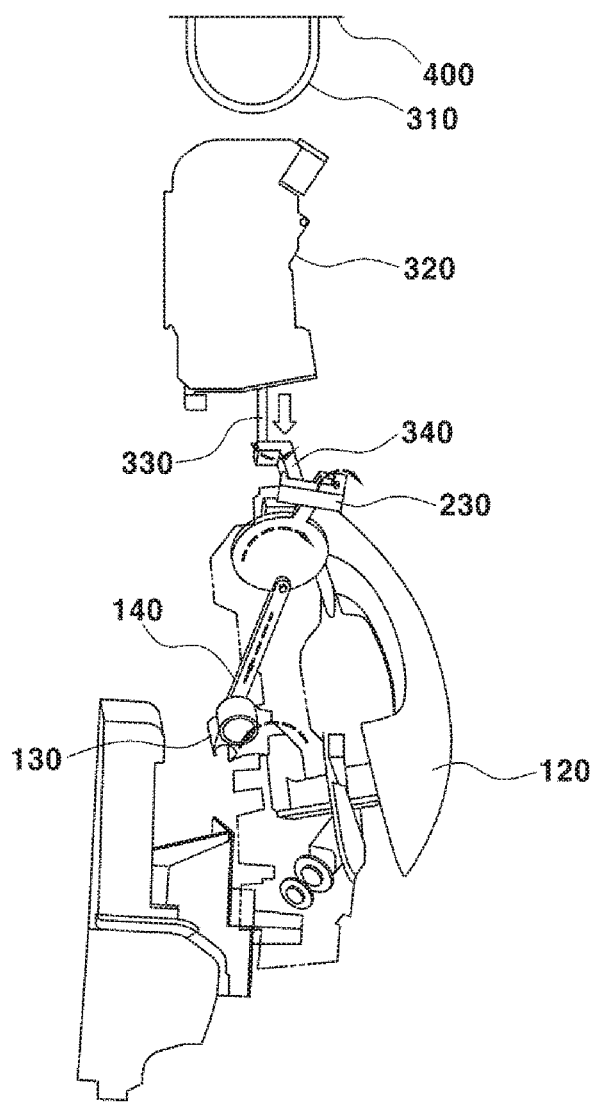
FIG. 3D illustrates a plan view when the outside handle of the sliding/swing complex door for a vehicle performs a second operation as an embodiment of the present disclosure.

FIG. 3C illustrates a plan view of major parts of the sliding/swing complex door for a vehicle as an embodiment of the present disclosure. FIG. 3D illustrates a plan view when the outside handle 100 of the sliding/swing complex door for a vehicle performs a second operation as an embodiment of the present disclosure.

Referring to FIGS. 3C and 3D, the sliding/swing complex door for a vehicle according to an embodiment of the present disclosure may further include a sliding striker 210 mounted on the inside of the vehicle body 400, a sliding latch part 220 positioned on the inside of the sliding door 200 and configured to be coupled to or released from the sliding striker 210, and a sliding handle lever rod 115 coupled to be released from the sliding striker 210 by applying tension to the sliding latch part 220 upon first operation. Furthermore, the sliding/swing complex door may further include a swing striker 310 mounted on the inside of the vehicle body 400, a swing latch part 320 positioned on the inside of the swing door 300 and configured to be coupled to or released from the swing striker 310, and a swing latch cable 330 coupled to be released from the swing striker 310 by applying tension to the swing latch part 320 upon second operation.

The sliding handle lever 114 may be coupled to the end of the sliding body in of the outside handle 100. More preferably, when the sliding body in is moved in the length direction by the first operation, the sliding handle lever 114 may be coupled to the end of the sliding body in so that the sliding handle lever 114 is rotated.

Furthermore, a sliding handle lever rod 115 may be eccentrically coupled to the rotation reference axis of the sliding handle lever 114. By the first operation, the sliding handle lever 114 may be rotated, and tension may be applied to the sliding handle lever rod 115. Furthermore, the sliding handle lever 114 may also be coupled to a release cable 292 coupled to a pawl.

The sliding handle lever rod 115 may be elongated to the bottom of the outside handle 100 and coupled to the sliding latch part 220. The sliding handle lever rod 115 to which tension is applied may be configured to release the sliding latch part 220.

The sliding latch part 220 is positioned on the lower side of the outside handle 100, and may be configured to be coupled to or released from the sliding striker 210. The sliding striker 210 may be fixed to the interior side of the vehicle body 400 in such a way to correspond to the location of the sliding latch part 220.

The sliding latch part 220 may be released from the sliding striker 210 by the first operation. More preferably, the sliding handle lever 114 may be rotated by the first operation of the outside handle. Tension may be applied to the eccentrically coupled sliding handle lever rod 115 by the rotation of the sliding handle lever 114.

Upon first operation, the sliding handle lever rod 115 may apply tension to the sliding latch part 220 so that the sliding latch part 220 and the sliding striker 210 are decoupled. When the sliding latch part 220 and the sliding striker 210 are decoupled, a passenger may open the sliding door 200 by pushing backward the outside handle in the length direction.

In the sliding/swing complex door for a vehicle according to an embodiment of the present disclosure, the sliding door 200 further includes a first fixing part 230 at the back thereof. The first fixing part 230 may be configured to be coupled to a swing handle lever rod 140, positioned at one end of the outside handle 100, and rotated therewith. Furthermore, the swing door 300 further includes a second fixing part 340 formed to correspond to a location of the first fixing part 230 where the sliding door 200 is fully opened and coupled to the first fixing part 230. The swing door 300 may be configured so that the second fixing part 340 is rotated by the rotation of the first fixing part 230 upon second operation and the swing latch cable 330 coupled to the top of the second fixing part 340 is released from the swing striker 310 by applying tension to the swing latch part 320.

When the swing body 116 is pulled by the second operation, a swing handle lever 130 may be coupled to be rotated.

Furthermore, the swing handle lever rod 140 may be eccentrically coupled to the rotation reference axis of the swing handle lever 130. By the second operation, the swing handle lever 130 may be rotated, and tension may be applied to the swing handle lever rod 140.

The swing handle lever rod 140 may be positioned to be coupled to the first fixing part 230 positioned at the back of the sliding door 200. More preferably, when tension is applied to the swing handle lever rod 140 by the second operation, the first fixing part 230 may be coupled to be rotated.

The first fixing part 230 may be positioned to come into contact with the second fixing part 340. More preferably, the first fixing part 230 positioned at the back of the sliding door 200 may come into contact with the second fixing part 340 positioned at one end of the swing door 300 when the sliding door 200 is fully opened.

The second fixing part 340 may be coupled to the swing latch cable 330. More preferably, the swing latch cable 330 elongated to the top of the outside handle 100 may be positioned to couple the second fixing part 340 and the swing latch part 320. The swing latch cable 330 to which tension is applied may be configured to release the swing latch part 320.

The swing latch part 320 is positioned on the upper side in the height direction of the outside handle 100, and may be configured to be coupled to the swing striker 310. The swing striker 310 may be fixed to the interior side of the vehicle body 400 in such a way to correspond to the location of the swing latch part 320.

The swing latch part 320 may be released from the swing striker 310 by the second operation. More preferably, when the outside handle 100 is pulled by the second operation, tension is applied to the swing latch cable 330, so the swing latch part 320 and the swing striker 310 may be decoupled.

Upon second operation in the state in which the sliding door 200 is fully opened, the sliding door 200 and the swing door 300 may be integrated and additionally opened. That is, when the sliding door 200 is fully opened, the first fixing part 230 may be configured to be coupled to the second fixing part 340. More preferably, the first fixing part 230 may be configured to have a given interval from the back of the sliding door 200. The second fixing part 340 may be configured to have a given interval on the front of one end of the swing door 300, and may be formed to be engaged with the swing door 300.

After the sliding door 200 is fully opened, upon second operation, the swing handle lever rod 140 may operate to rotate the first fixing part 230. The rotated first fixing part 230 may be configured to be engaged with the second fixing part 340 and rotated therewith, thus applying tension to the swing latch cable 330. The swing latch cable 330 may be configured to be released from the swing striker 310 by applying tension to the swing latch part 320. When the swing latch part 320 and the swing striker 310 are decoupled, the sliding door 200 and the swing door 300 may be integrated and additionally opened.

The second fixing part 340 may be formed in the swing door 300 in accordance with a location of the first fixing part 230 where the sliding door 200 is fully opened. More preferably, when the sliding door 200 is fully opened, the first fixing part 230 of the sliding door 200 and the second fixing part 340 of the swing door 300 may come into contact with each other.

Figure 4A:
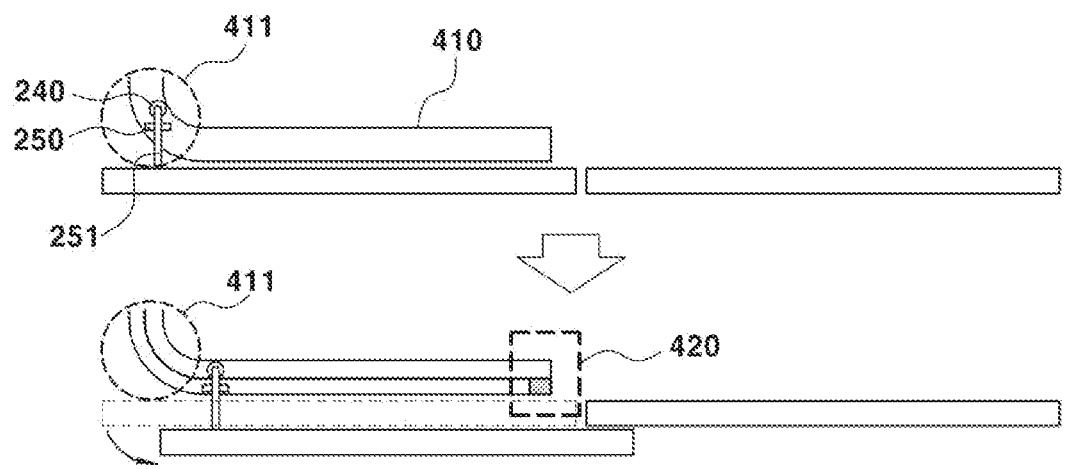
FIG. 4A illustrates a first rail, first roller, and second roller of the sliding/swing complex door for a vehicle as an embodiment of the present disclosure.

FIG. 4A illustrates a first rail 410, a first roller 240, and a second roller 250 of the sliding/swing complex door for a vehicle as an embodiment of the present disclosure.

Referring to FIG. 4A, the sliding/swing complex door for a vehicle according to an embodiment of the present disclosure further includes the first rail 410 fixed to the vehicle body 400. The first roller 240 and the second roller 250 disposed at the top of the sliding door 200 may be configured to move along the first rail 410 in accordance with an opening operation of the sliding door 200. Furthermore, the first roller 240 may be configured to limit a movement of the sliding door 200 in the width direction. The second roller 250 may be configured to limit a movement of the sliding door 200 in the height direction.

The first rail 410 is fixed to the vehicle body 400, and may be positioned in the length direction, that is, the moving direction of the sliding door 200. More preferably, as illustrated in FIG. 2, the first rail 410 may be positioned on the upper side of the vehicle body 400 in accordance with the top of the sliding door 200. Furthermore, the first rail 410 may be configured to have a curved part 411 formed at its one end.

While the sliding door 200 is opened and closed, the first roller 240 and the second roller 250 may be coupled to a first roller guide 251 and move along the first rail 410. More preferably, the first roller 240 is coupled to one end of the first roller guide positioned at the top of the sliding door 200, and may limit a movement of the sliding door 200 in the width direction when the sliding door 200 is opened or closed. The second roller 250 is coupled to the other end of the first roller guide 251 positioned at the top of the sliding door 200, and may limit a movement of the sliding door 200 in the height direction when the sliding door 200 is opened or closed.

The first roller 240 and the second roller 250 may be isolated from the sliding door 200 and moved along the first rail 410. More preferably, the first roller 240 and the second roller 250 are isolated from the sliding door 200 by the first roller guide 251, and may be configured to move between the inside of the first rail 410 and the back of the sliding door 200 and to open and close the sliding door 200. Furthermore, the sliding door 200 may be isolated by the first roller guide 251 and opened and closed along the curved part of the first rail 410. When the sliding door 200 is moved, the curved part 411 may be configured to pop up in order to avoid interference with the swing door 300.

Furthermore, referring to FIG. 4A, the sliding/swing complex door for a vehicle according to an embodiment of the present disclosure may further include an opening part 420 positioned at the end of the first rail 410 and formed to correspond to the location of the first roller 240 and the second roller 250 when the sliding door 200 is fully opened. More preferably, when the sliding door 200 is fully opened through the opening part 420, integrated with the swing door 300, rotated, swung and opened, the first roller 240 and the second roller 250 may be deviated from the first rail 410.

Figure 4B:
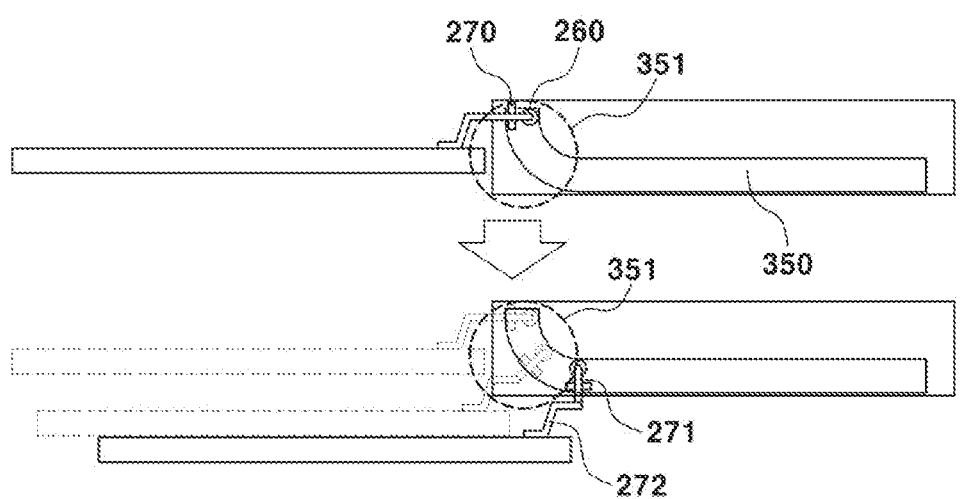
FIG. 4B illustrates a second rail, third roller, and fourth roller of the sliding/swing complex door for a vehicle as an embodiment of the present disclosure.

FIG. 4B illustrates a second rail 350, a third roller 260, and a fourth roller 270 of the sliding/swing complex door for a vehicle as an embodiment of the present disclosure.

Referring to FIG. 4B, the sliding/swing complex door for a vehicle according to an embodiment of the present disclosure further includes the second rail 350 fixed to the back of the swing door 300 and positioned at a location lower than the first rail 410. The third roller 260 and the fourth roller 270 disposed in the middle of the sliding door 200 may be configured to move along the second rail 350 in accordance with an opening operation of the sliding door 200. Furthermore, the third roller 260 may be configured to limit a movement of the sliding door 200 in the width direction. The fourth roller 270 may be configured to limit a movement of the sliding door 200 in the height direction.

The second rail 350 is fixed to the back of the swing door 300, and may be formed in the length direction, that is, the moving direction of the sliding door 200. More preferably, as illustrated in FIG. 2, the second rail 350 may be positioned at a location lower than the first rail 410, and may be formed in the middle of the swing door 300 to correspond to the middle part of the sliding door 200. Furthermore, the second rail 350 may be configured to have a curved part 351 formed at one end.

While the sliding door 200 is opened and closed, the third roller 260 and the fourth roller 270 may be coupled to a second roller guide 271 and move along the second rail 350. More preferably, the third roller 260 may be coupled to one end of the second roller guide 271 positioned in the middle of the sliding door 200, and may limit a movement of the sliding door 200 in the width direction when the sliding door 200 is opened or closed. The fourth roller 270 may be coupled to the other end of the second roller guide 271 positioned in the middle of the sliding door 200, and may limit a movement of the sliding door 200 in the height direction when the sliding door 200 is opened or closed.

The third roller 260 and the fourth roller 270 may be isolated from the sliding door 200, and may move along the second rail 350. More preferably, the third roller 260 and the fourth roller 270 are isolated from the sliding door 200 by the second roller guide 271, and may be configured to move between the inside of the second rail 350 and the back of the sliding door 200 and to open and close the sliding door 200. Furthermore, the back coupling part 272 of the sliding door 200 is hinged on to one end of the second roller guide 271, and may be configured to apply a degree of freedom to the sliding door 200 when the sliding door 200 moves in the length direction.

Furthermore, the sliding door 200 may be isolated by the second roller guide 271 and opened and closed along the curved part 351 of the second rail 350. The curved part 351 may be configured to pop up in order to avoid interference with the swing door 300 when the sliding door 200 moves.

Figure 5A:
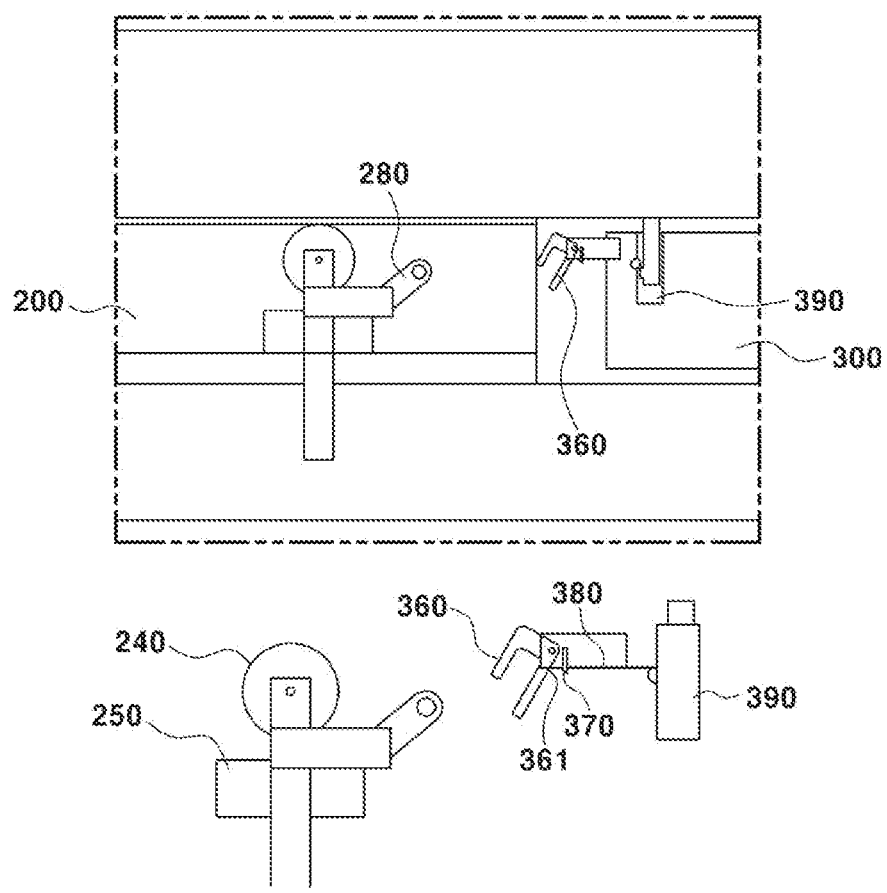
FIG. 5A illustrates a fixing pin and a catch when the sliding/swing complex door for a vehicle performs a sliding operation as an embodiment of the present disclosure.
Figure 5B:
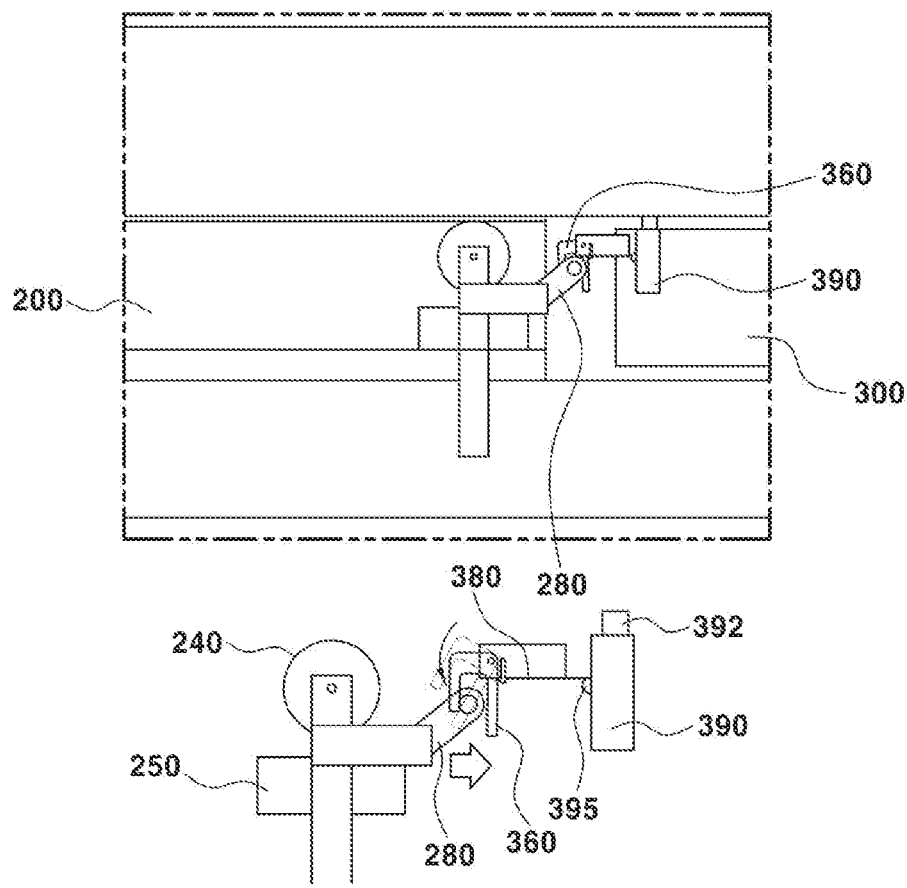
FIG. 5B illustrates the fixing pin and the catch when the sliding door of the sliding/swing complex door for a vehicle is fully opened as an embodiment of the present disclosure.

FIG. 5A illustrates a fixing pin 280 and a catch 360 when the sliding/swing complex door for a vehicle performs a sliding operation as an embodiment of the present disclosure. FIG. 5B illustrates the fixing pin 280 and the catch 360 when the sliding door 200 of the sliding/swing complex door for a vehicle is fully opened as an embodiment of the present disclosure.

Referring to FIGS. 5A and 5B, in the sliding/swing complex door for a vehicle according to an embodiment of the present disclosure, the fixing unit further includes the fixing pin 280 positioned at one side of the sliding door 200 and the catch 360 positioned at one end of the swing door 300 in accordance with the location of the fixing pin 280. The fixing unit may be configured so that the catch 360 rotates and fixes the fixing pin 280 when the sliding door 200 is fully opened.

The fixing pin 280 is positioned at one end of the sliding door 200, and may be configured to be fixed to the catch 360. More preferably, the fixing pin 280 may be fixed and coupled to the first roller guide 251 at the top of the sliding door 200, and may move toward one end of the swing door 300 along with the first roller 240 and the second roller 250 during an opening operation of the sliding door 200.

The catch 360 may have a shape having an opening part to surround the fixing pin 280. Right before the sliding door 200 is fully opened, the fixing pin 280 may be led into the opening part. When the sliding door 200 is fully opened, the opening part of the catch 360 comes into contact with one end of the fixing unit and additionally rotates to surround the fixing pin 280, so the catch 360 and the fixing pin 280 may be fixed.

The catch 360 may be positioned to correspond to the location of the fixing pin 280 at one end of the swing door 300, and may be configured to have the fixing pin 280 fixed thereto. More preferably, one end of the catch 360 and the shape of the fixing pin 280 may be formed to correspond to each other so that the catch 360 rotates and fixes the fixing pin 280 while surrounding the fixing pin 280 when the sliding door 200 is fully opened.

The sliding/swing complex door for a vehicle according to an embodiment of the present disclosure may be configured to further include a catch lock 370 adjacent to the catch 360 and configured to be engaged with the catch 360, a catch lock cable 380 coupled to one end of the catch lock 370 and applying tension to release the lock state of the catch lock 370, and an overslam bumper 390 positioned at the back of the swing door and configured to couple the catch lock 370 and the catch lock cable 380.

Furthermore, the sliding/swing complex door may be configured so that when the sliding door 200 is fully opened, the catch 360 is rotated and thus a hitch part 361 provided at one end of the catch 360 is engaged with the catch lock 370.

The catch lock 370 is positioned adjacent to the catch 360, and may be configured to be coupled to the catch 360. More preferably, the catch lock 370 has one end hinged on to the swing door 300 and the other end coupled to the catch lock cable 380. The catch lock 370 may be configured to have the other end pulled on the basis of the hinge coupling when tension is applied to the catch lock cable 380. The hitch part 361 formed at one end of the catch 360 rotated as the sliding door 200 is fully opened may be fixed to neighbor the other end of the catch lock 370. The hitch part 361 may be formed at one end of the catch 360 in a shape corresponding to the other end of the catch lock 370. Accordingly, the sliding door 200 may be fixed in such a way to be integrated and rotated with the swing door 300.

The catch lock cable 380 is coupled to the catch lock 370, and may apply tension to decouple the catch lock 370 and the hitch part 361 of the catch 360. More preferably, the catch lock cable 380 may be configured to pull the catch lock 370 by tension applied thereto when the swing door 300 is closed and to rotate the catch 360 by the release of the catch lock 370 from the hitch part 361 of the catch 360 when one end of the catch lock 370 is pulled.

In this case, a spring for rotation toward the catch 360 may be positioned in the catch lock 370, and thus the catch lock 370 may return to its original location after one end of the catch lock 370 is pulled.

The overslam bumper 390 is positioned at the back of the swing door 300, and may be configured to come into contact with the outside the vehicle body 400 when the swing door 300 is closed. The catch lock 370 is coupled to the overslam bumper 390 by the catch lock cable 380, and may be configured to be rotated by the driving of the overslam bumper 390.

Figure 5C:
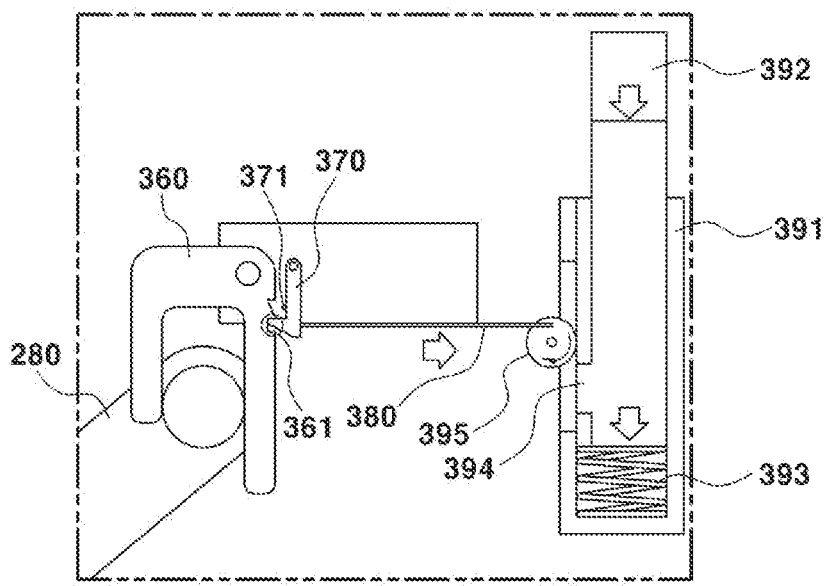
FIG. 5C illustrates an overslam bumper of the sliding/swing complex door for a vehicle as an embodiment of the present disclosure.
Figure 5D:
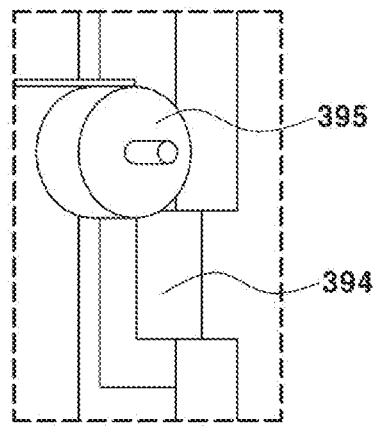
FIG. 5D illustrates an enlarged view of a gear unit and rotator of the sliding/swing complex door for a vehicle as an embodiment of the present disclosure.

FIG. 5C illustrates the overslam bumper 390 of the sliding/swing complex door for a vehicle as an embodiment of the present disclosure. FIG. 5D illustrates an enlarged view of a gear unit 394 and a rotator 395 of the sliding/swing complex door for a vehicle as an embodiment of the present disclosure.

Referring to FIGS. 5C and 5D, in the sliding/swing complex door for a vehicle according to an embodiment of the present disclosure, when the swing door 300 is closed, the overslam bumper 390 may be compressed by the vehicle body 400, and may apply tension to the catch lock cable 380 so that the lock state of the catch lock 370 is released.

Furthermore, the overslam bumper 390 includes a cylinder housing 391 positioned on the outside of the overslam bumper 390, an overslam rod 392 positioned within the cylinder housing 391 and configured to be movable up and down, an overslam spring 393 positioned under the overslam rod 392 to provide an elastic force, the gear unit 394 formed on one side of the overslam rod 392 and configured to rotate the rotator 395 when the overslam rod 392 moves up and down, and the rotator 395 positioned on the side of the cylinder housing 391 corresponding to the gear unit 394 and configured to be integrated and rotated with the gear unit 394. The overslam bumper 390 may be configured so that when the swing door 300 is closed, the gear unit 394 moves downward and rotates the rotator 395 to apply tension to the catch lock cable 380.

The cylinder housing 391 is positioned along the outside of the overslam rod 392, and may be led into the back of the swing door 300 and fixed thereto. The overslam spring 393 is positioned within the cylinder housing 391. The overslam rod 392 may be configured to come into contact with the overslam spring 393. The overslam rod 392 may be moved up and down along the cylinder housing 391. When the swing door 300 is closed and pressurized by the outside of the vehicle body, the overslam rod 392 may move downward and compress the overslam spring 393. When the overslam rod 392 is detached from the vehicle body 400 by the opening of the swing door 300, the overslam rod 392 may be moved upward by an elastic force of the overslam spring 393.

The gear unit 394 configured to rotate the rotator 395 when the overslam rod 392 moves downward may be positioned on one side of the overslam rod 392. The rotator 395 which may be integrated and rotated with the gear unit 394 may be positioned on the side of the cylinder housing 391 corresponding to the gear unit 394.

One end of the catch lock cable 380 is eccentrically coupled to the rotation shaft of the rotator 395, and the other end thereof may be coupled to one end of the catch lock 370. Furthermore, a catch lock pin 371 for preventing further rotation toward the catch 360 by the spring force of the catch lock 370 may be positioned in the swing door 300.

Figure 5E:
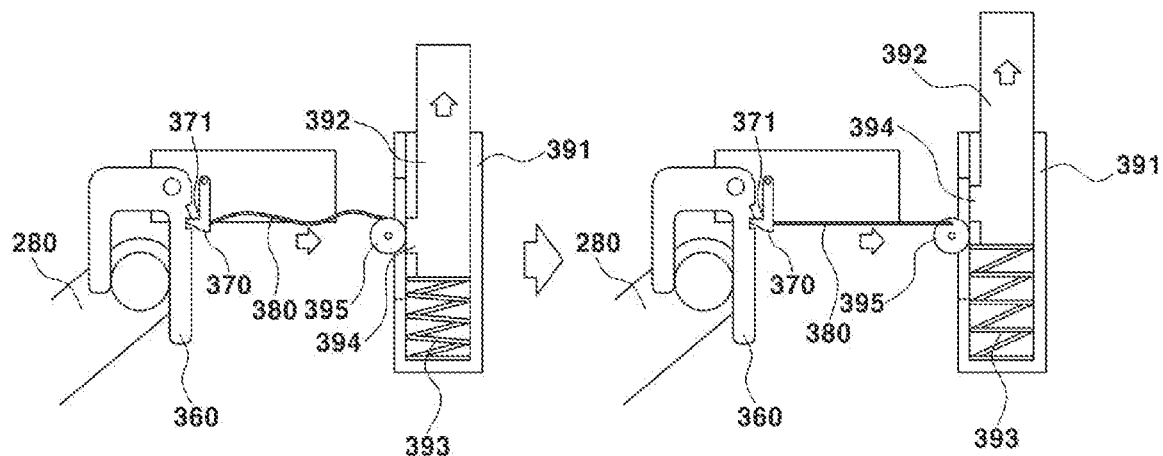
FIG. 5E illustrates an overslam bumper when the swing door of the sliding/swing complex door for a vehicle is opened as an embodiment of the present disclosure.

FIG. 5E illustrates the overslam bumper when the swing door of the sliding/swing complex door for a vehicle is opened as an embodiment of the present disclosure.

Referring to FIG. 5E, when the swing door 300 is opened, the overslam rod 392 may be moved upward by an elastic force of the overslam spring 393. More preferably, when the swing door 300 is opened and the overslam rod 392 is detached from the vehicle body 400, the gear unit 394 may rotate the rotator 395 counterclockwise by the upward movement of the overslam rod 392. The gear unit 394 may be a rack gear. A spring having a smaller coefficient of elasticity than a spring included in the catch lock 370 may be positioned in the rotator 395. Accordingly, although the rotator 395 is rotated clockwise and returned to its original location, it does not apply tension to the catch lock cable 380, and the catch lock 370 may maintain a stop state. Accordingly, when opened, the swing door 300 may be integrated and rotated with the sliding door 200.

When the swing door 300 is closed, the overslam rod 392 may be pressed by the vehicle body 400, and the catch 360 and the fixing pin 280 may be decoupled. More preferably, the gear unit 394 may be rotated by the overslam rod 392 that is moved downward, and the rotator 395 may be rotated along with the rotation of the gear unit 394. When the rotator 395 is rotated, tension is applied to the catch lock cable 380. When the catch lock 370 is pulled, the catch lock 370 and the catch 360 may be decoupled. Accordingly, the coupled sliding door 200 and swing door 300 may be released to close the sliding door 200.

When an external force opposite an input value for the first operation is applied or the sliding latch part 220 comes into contact with the sliding striker 210 and moves in the direction in which the sliding door 200 is fully closed, the sliding latch part 220, together with the sliding striker 210, may switch to a lock state. More preferably, when the sliding handle lever 114 is applied with an external force opposite an input value for the first operation or the sliding latch part 220 comes into contact with the sliding striker 210 and moves in the direction in which the sliding door 200 is fully closed, the sliding handle lever 114 may be configured to be rotated in a direction opposite the direction when the first operation is performed, thus moving the sliding handle lever rod 115. The sliding latch part 220, together with the sliding striker 210, may be locked in the moving direction of the sliding handle lever rod 115.

In summary, embodiments of the present disclosure provide the complex door having advantages of the sliding method and the swing method mixed by combining the sliding method and the swing method with a door system for a vehicle, and provide the sliding/swing complex door for a vehicle which can be opened and closed using the sliding method and the swing method based on a change in the operation method of the one outside handle 100.

Embodiments of the present disclosure may have the following effects based on the configurations, coupling and use relations described in the aforementioned embodiments.

Embodiments of the present disclosure have an effect in that they can maximize space utilization because space availability, that is, an advantage of the sliding door, and a maximum opening width in the full open state, that is, an advantage of the swing door, are used.

Furthermore, embodiments of the present disclosure have an effect in that they can increase the opening width even using a small rotation radius because the sliding door and the swing door are integrated and rotated after the door slides.

Furthermore, embodiments of the present disclosure have an effect in that they can enhance a passenger's convenience by providing the outside handle capable of the two-stage operation, which is designed to have a structure corresponding to the opening and closing method of the sliding or swing door.

The above detailed description illustrates the present disclosure. Furthermore, the aforementioned describes preferred embodiments of the present disclosure, and the present disclosure may be used in various other combinations, changes and environments. That is, the present disclosure may be changed or modified within the range of a concept of the invention disclosed in this specification, the scope of the disclosure contents and equivalent scopes thereof and/or the range of technology or knowledge in the art. The aforementioned embodiments describe the best state for implementing the technical spirit of the present disclosure, and may include various changes required for a detailed application field and use of the present disclosure. Accordingly, the detailed description of the present disclosure is not intended to restrict the present disclosure to the disclosed implementation state. Furthermore, the appended claims should be interpreted as including other implementation states.

What is claimed is:

1. A sliding/swing complex door for a vehicle comprising:
   a sliding door;
   an outside handle positioned on the outside of the sliding door, wherein the sliding door is configured to be opened upon a first operation of the outside handle;
   a swing door configured to be integrated and opened with the sliding door upon a second operation of the outside handle; and
   a fixing unit for fixing the sliding door to the swing door so that the swing door and the sliding door can be integrally rotated and opened when the sliding door is fully opened;
   wherein the outside handle comprises a body part and a handle cover part, and wherein the body part comprises:
      a sliding body configured to be movable in a sliding direction in a way integrated with the handle cover part upon the first operation; and
      a swing body capable of being integrated and pulled along with the handle cover part upon the second operation.

2. The sliding/swing complex door of claim 1, further comprising:
   a sliding striker mounted on an inside of a vehicle body;
   a sliding latch part positioned on an inside of the sliding door and configured to be coupled to or released from the sliding striker; and
   a sliding handle lever rod configured to be released from the sliding striker by applying tension to the sliding latch part upon the first operation.

3. The sliding/swing complex door of claim 1, further comprising:
   a swing striker mounted on an inside of a vehicle body;
   a swing latch part positioned on an inside of the swing door and configured to be coupled to or released from the swing striker; and
   a swing latch cable configured to be released from the swing striker by applying tension to the swing latch part upon the second operation.

4. The sliding/swing complex door of claim 1, further comprising a first fixing part in a back of the sliding door, wherein the first fixing part is coupled to a swing handle lever rod positioned at one end of the outside handle and is configured to be rotated.

5. The sliding/swing complex door of claim 4, wherein:
   the swing door further comprises a second fixing part formed in accordance with a location of the first fixing part where the sliding door is fully opened and coupled to the first fixing part; and
   the swing door is configured so that the second fixing part is integrated and rotated with the first fixing part by the rotation of the first fixing part upon the second operation and a swing latch cable coupled to a top of the second fixing part is configured to decouple a swing latch part and a swing striker by applying tension to the swing latch part.

6. The sliding/swing complex door of claim 1, further comprising a first rail fixed to a vehicle body, wherein a first roller and a second roller disposed at a top of the sliding door are configured to move along the first rail in accordance with an opening operation of the sliding door.

7. The sliding/swing complex door of claim 6, further comprising a second rail fixed to a back of the swing door and positioned at a location lower than the first rail, wherein a third roller and a fourth roller disposed in a middle of the sliding door are configured to move along the second rail in accordance with the opening operation of the sliding door.

8. The sliding/swing complex door of claim 6, further comprising an opening part positioned at an end of the first rail and formed to correspond to a location of the first roller and the second roller when the sliding door is fully opened.

9. The sliding/swing complex door of claim 1, wherein the fixing unit comprises:
   a fixing pin positioned at one end of the sliding door; and
   a catch positioned at one end of the swing door to correspond to a location of the fixing pin,
   wherein, when the sliding door is fully opened, the catch is configured to be rotated to fix the fixing pin.

10. The sliding/swing complex door of claim 9, further comprising:
   a catch lock adjacent to the catch and configured to be engaged with the catch;
   a catch lock cable coupled to an end of the catch lock and applying tension to release a lock state of the catch lock; and
   an overslam bumper positioned at a back of the swing door and configured to be coupled to the catch lock by the catch lock cable.

11. The sliding/swing complex door of claim 10, wherein the catch is configured to be rotated so that a hitch part provided at one end of the catch is engaged with the catch lock.

12. The sliding/swing complex door of claim 10, wherein when the swing door is closed, the overslam bumper is compressed by a vehicle body and is configured to apply the tension to the catch lock cable to release the lock state of the catch lock.

13. The sliding/swing complex door of claim 12, wherein the overslam bumper comprises:
   a cylinder housing positioned on an outside of the overslam bumper;
   an overslam rod positioned within the cylinder housing and configured to be movable up and down;
   an overslam spring positioned under the overslam rod and configured to provide an elastic force;
   a gear unit formed on one side of the overslam rod and configured to rotate a rotator when the overslam rod moves up and down; and
   the rotator positioned on a side of the cylinder housing corresponding to the gear unit and configured to be integrated and rotated with the gear unit,
   wherein the overslam bumper is configured so that when the swing door is closed, the gear unit is configured to move downward and rotate the rotator to apply the tension to the catch lock cable.

14. A vehicle comprising:
   a vehicle body;
   a sliding door coupled to the vehicle body;
   an outside handle positioned on an outside of the sliding door, wherein the sliding door is configured to be opened upon a first operation of the outside handle;
   a swing door configured to be integrated and opened with the sliding door upon a second operation of the outside handle; and
   a fixing unit for fixing the sliding door to the swing door so that the swing door and the sliding door can be integrally rotated and opened when the sliding door is fully opened;
   wherein the outside handle comprises a body part and a handle cover part, and wherein the body part comprises:
      a sliding body configured to be movable in a sliding direction in a way integrated with the handle cover part upon the first operation; and
      a swing body capable of being integrated and pulled along with the handle cover part upon the second operation.

15. The vehicle of claim 14, further comprising:
   a sliding striker mounted on an inside of the vehicle body;
   a sliding latch part positioned on an inside of the sliding door and configured to be coupled to or released from the sliding striker;
   a sliding handle lever rod configured to be released from the sliding striker by applying tension to the sliding latch part upon the first operation;
   a swing striker mounted on the inside of the vehicle body;
   a swing latch part positioned on an inside of the swing door and configured to be coupled to or released from the swing striker; and
   a swing latch cable configured to be released from the swing striker by applying tension to the swing latch part upon the second operation.

16. The vehicle of claim 14, further comprising a first fixing part in a back of the sliding door, wherein:
   the first fixing part is coupled to a swing handle lever rod positioned at one end of the outside handle and is configured to be rotated;
   the swing door further comprises a second fixing part formed in accordance with a location of the first fixing part where the sliding door is fully opened and coupled to the first fixing part; and
   the swing door is configured so that the second fixing part is integrated and rotated with the first fixing part by the rotation of the first fixing part upon the second operation and a swing latch cable coupled to a top of the second fixing part is configured to decouple a swing latch part and a swing striker by applying tension to the swing latch part.

17. The vehicle of claim 14, further comprising:
   a first rail fixed to the vehicle body;
   a second rail fixed to a back of the swing door and positioned at a location lower than the first rail;
   a first roller and a second roller disposed at a top of the sliding door and configured to move along the first rail in accordance with an opening operation of the sliding door;
   a third roller and a fourth roller disposed in a middle of the sliding door and configured to move along the second rail in accordance with the opening operation of the sliding door; and
   an opening part positioned at an end of the first rail and formed to correspond to a location of the first roller and the second roller when the sliding door is fully opened.

18. The vehicle of claim 14, further comprising a first rail fixed to the vehicle body, wherein a first roller and a second roller disposed at a top of the sliding door are configured to move along the first rail in accordance with an opening operation of the sliding door.

19. A vehicle comprising:
   a vehicle body;
   a sliding door coupled to the vehicle body;
   an outside handle positioned on an outside of the sliding door, wherein the sliding door is configured to be opened upon a first operation of the outside handle;
   a swing door configured to be integrated and opened with the sliding door upon a second operation of the outside handle; and
   a fixing pin positioned at one end of the sliding door;
   a catch positioned at one end of the swing door to correspond to a location of the fixing pin, wherein, when the sliding door is fully opened, the catch is configured to be rotated to fix the fixing pin;

a catch lock adjacent to the catch, wherein the catch is configured to be rotated so that a hitch part provided at one end of the catch is engaged with the catch lock;

a catch lock cable coupled to an end of the catch lock and applying tension to release a lock state of the catch lock; and an overslam bumper positioned at a back of the swing door and configured to be coupled to the catch lock by the catch lock cable, wherein when the swing door is closed, the overslam bumper is compressed by the vehicle body and is configured to apply the tension to the catch lock cable to release the lock state of the catch lock.

20. The vehicle of claim 19, wherein the overslam bumper comprises:

a cylinder housing positioned on an outside of the overslam bumper;

an overslam rod positioned within the cylinder housing and configured to be movable up and down;

an overslam spring positioned under the overslam rod and configured to provide an elastic force;

a gear unit formed on one side of the overslam rod and configured to rotate a rotator when the overslam rod moves up and down; and the rotator positioned on a side of the cylinder housing corresponding to the gear unit and configured to be integrated and rotated with the gear unit, wherein the overslam bumper is configured so that when the swing door is closed, the gear unit is configured to move downward and rotate the rotator to apply the tension to the catch lock cable.

\* \* \* \* \*